United States Patent Office 3,493,750
Patented Feb. 3, 1970

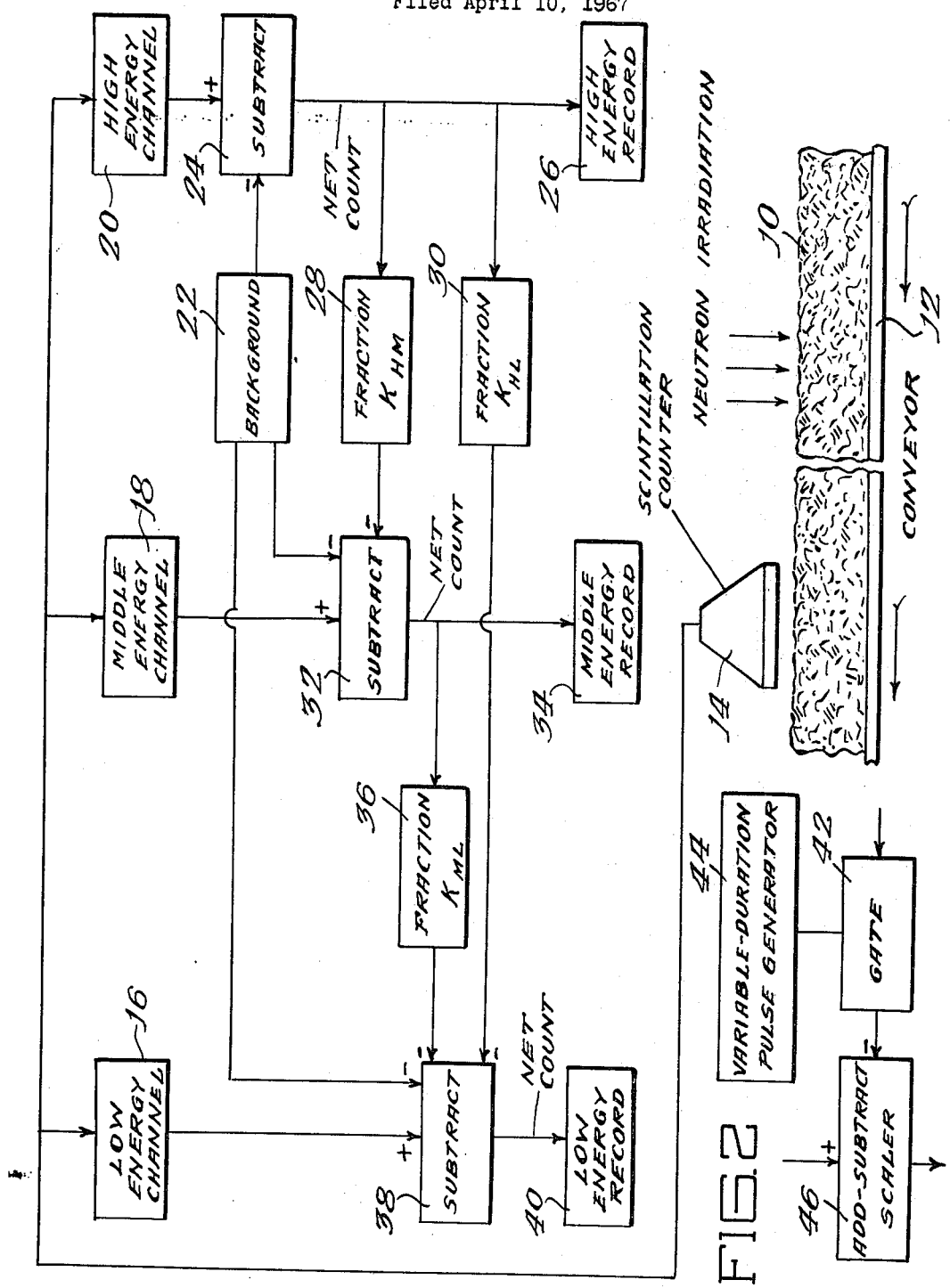

3,493,750
METHOD AND APPARATUS FOR
RADIOACTIVITY ANALYSIS
Ira L. Morgan and James D. Hall, Austin, Tex., assignors to Texas Nuclear Corporation, Austin, Tex., a corporation of Texas
Filed Apr. 10, 1967, Ser. No. 629,621
Int. Cl. G01j 39/18
U.S. Cl. 250—71.5                            10 Claims

ABSTRACT OF THE DISCLOSURE

Individual energy-peaks of a scintillation-counter pulse-height spectrum are discriminated in appropriate channels corresponding to all peaks above the lowest to be measured. The pulses in each channel above the lowest are fed to all lower channels through time-division gates, and the fraction so derived is continuously subtracted from the pulse count in the respective lower channels. Output counting-rate in each channel varies only with variation of the radiation of the energy to which it corresponds.

---

This invention relates to scintillation-counter measurement of radiation, and more particularly to measurement of individual components of particular characteristic energies, in the presence of higher-energy components which are independent variables in the measurement.

Scintillation counters are in common use for a variety of purposes in which energy-discrimination among radiation components is desired. Where the radiation under measurement consists of gamma rays of different energies which must be discriminated, the use of the scintillation counter is virtually universal except in laboratory-type equipment, this being presently the only type of radiation detector readily usable in such measurements with simple forms of circuits and without the introduction of complexities such as differential shielding, etc. once used for such purposes with earlier detection instruments. For many purposes, the scintillation counter is considered a proportional-type detector, i.e., one in which the output pulses are proportional to the energy of the incident radiation. Where measurements are made on a source producing, for example, mono-energetic gamma rays, this approximation of the operation produces relatively little error, and the associated circuits may be designed in the same general manner as in the case of a gas proportional counter for use with radiation which is directly ionizing. Such circuits universally employ some form of lower-level discrimination, passing pulses of some minimum amplitude, and usually employ an upper-level discriminator to prevent counting of high-energy background radiation. Where both upper and lower discrimination is employed, there is thus formed a channel or "window" which selects from the output spectrum of the detector the pulses of the predetermined range of amplitudes. The width of the window selected for the counting of monochromatic radiation normally represents a compromise between considerations of time required for making the measurement, on the one hand, and discrimination against noise and background, on the other hand.

Actually, the output of a scintillation detector does not have the more or less uniform pulse-height distribution which would result were all of the events taking place in the scintillation medium of the type which produces light output proportional to the energy of the gamma ray. The capture of gamma rays which produces such light pulses is only one manner of interaction between the radiation and the crystal, and there are produced by Compton scattering a multitude of output pulses of much lesser amplitude than the amplitude characteristic of the particular energy. The spectrum (occurrence rate as a function of amplitude) produced by this type of reaction is highly concentrated at low energies, more or less resembling the shape of a negative exponential curve when plotted.

Accordingly, if there are present two or more gamma rays of which the intensities may vary independently, the counts obtained in the channels or windows of the lower peaks are affected by the higher-energy intensity. Where three or four or more independently varying energies are to be measured, interpretation of the data in the lower channels is difficult.

In laboratory-type uses of radioactivity, analysis of such spectra is normally made either by complex calculation or by matching the data to spectra representing known constituents. In certain types of laboratory equipment employed for repetitive measurement of samples of the same isotopes, provision may be made for automatically transferring the data recorded in each channel to a calculator.

An important potential use of spectrum analysis, long known in principle, is in industrial production-line monitoring or measurement employing neutron activation techniques. Neutron activation analysis is in wide use for a variety of laboratory-type measurements, but presently finds little routine industrial use, one limitation on such use being the complexity of the equipment required for accurate on-line interpretation of data, particularly where ratios must be calculated.

It is the principal object of the present invention to provide a very simple method and apparatus for producing a highly accurate direct indication of the intensity of the radiations of the various characteristic energies present in such a spectrum. In the present invention, as in the prior art, counting channels are formed for each of the characteristic radiations. However, except for the uppermost energy channel, no direct record is made of the frequency of occurrence of these pulses, the present device resembling that of U.S. Patent 3,108,188 in this respect. With the pulses in each lower channel, there is subtractively mixed a fraction of the pulses from each higher channel, this fraction corresponding to the full count in the lower channel produced by radiations of the characteristic energy of the higher channel. Thus the net number of pulses passed on for recording in each channel is continuously representative only of the intensity of the radiation of the energy thereby represented, and requires no correction for variations of intensity in any of the higher channels. Where ratios are to be determined, as is not uncommon, the channel indications may be directly used for calculation by simple division.

In further accordance with the invention, the fraction of the counts in each higher channel is obtained in a simple manner which permits essentially continuous precise selection of fraction value, without the necessity of "rounding off" which characterizes the extraction of fractions by calculation apparatus of reasonable simplicity. Rather than being fed to a calculation circuit, each higher-energy pulse train is fed to each lower-energy channel through a simple periodically-opened gate, the open-time being the desired fraction of each cycle of the periodic operation. Proper operation is in no way impaired by the fact that the periodic "sampling" may produce substantial variation in the number of pulses transmitted in each cycle.

The invention is illustrated in the drawing, in which:

FIGURE 1 is a schematic diagram of a neutron activation analysis apparatus incorporating the teachings of the invention; and FIGURE 2 is a fragmentary block diagram of particular components advantageously employed in a portion of the device of FIGURE 1.

The device shown in the drawing, and its operation, will readily be understood from the general description of the invention already given. The illustrated embodiment is employed in neutron activation analysis of material 10 on a conveyor belt 12. As indicated by arrows in the drawing, the material 10 is irradiated by neutrons at a point on the conveyor prior to passing beneath a scintillation counter 14. As is well known, the neutron irradiation produces gamma activities which may subsequently be counted for purposes of analysis of the irradiated material. The conveyor 12 is run at a constant speed to control the time between the irradiation and the measurement of the resulting activities.

The spectrum of pulses from the scintillation counter 14 is analyzed, in the illustrated embodiment, in three (a number selected for simple illustration) channels or windows 16, 18 and 20, in the order of ascending pulse amplitude range. The channels 18 and 20 correspond to the only characteristic energies in the spectrum above the lowermost characteristic energy, which appears in channel 16.

An artificial background generator 22 is employed to correct for background in all channels. Obviously, the background subtraction correction is not in general the same in all channels, and the background generator 22 has separate outputs for the three channels; one form of such generator may incorporate a fixed frequency periodic pulse train, with time-gated outputs, generally similar to the fraction gates to be hereinafter described.

The pulse output in the high energy channel 20 has the background subtracted in a suitable subtraction device 24. The net count is fed to a suitable recording device 26. The pulses representing the net count in the high energy channel are also fed to the two lower channels through fraction-deriving circuits 28 and 30, respectively. The fraction $K_{HM}$ is fed from the high channel to the middle channel, and the fraction $K_{HL}$ is fed from the high channel to the low channel.

The output pulses of the middle energy channel window 18 are fed to a subtraction device 32, in which there is subtracted therefrom the background 22 and the fraction $K_{HM}$ from the high channel. The net output is recorded at 34. A fraction of this net output, $K_{ML}$, is transmitted at 36 to the low energy channel. In a low energy subtraction device 38, the background and the fractions from the two higher channels are subtracted from the low energy channel pulses, and the net is recorded at 40.

As shown in FIGURE 2, each of the fraction or "K-factor" transmission links 28, 30 and 36 consists merely of a gate 42 operated by a variable-duration pulse generator 44 (such as an ordinary multivibrator circuit), and the subtraction devices at 24, 32, and 38 are add-subtract scalers 46.

It will be understood that activities which are, in the context of the purpose of the measurement, known to be at all times constant do not constitute part of the spectrum for purposes of the invention, although they may produce a constant background in a lower channel, which may be compensated as ambient background. Similarly, there may exist characteristic energies in the spectrum for which no channel need be provided if the variation is known to be exactly the same as that of one of the energies for which a channel is provided, such as in the case of an element present in the material 10 which produces, upon irradiation, gamma rays of two different energies. If, for reasons of convenience such as relative counting-rate, the lower of such energies is selected for the monitoring window or channel (such an embodiment not being illustrated), this channel constitutes the higher-energy channel for purposes of feeding subtraction pulses to intermediate channels, while constituting the lower-energy channel for purposes of receiving pulses from the intermediate channel.

Obviously, the scope of the protection to be given the invention should not be limited to the particular embodiment illustrated, but should extend to all uses of the invention as defined in the appended claims, and equivalents thereof.

What is claimed is:
1. In the method of producing indications of the intensity of radiations of three or more different energies comprising:
  (a) detecting the radiations with a counter producing pulses with an amplitude spectrum having peaks corresponding to characteristic energies of the radiations superimposed on an amplitude distribution produced by radiation of higher energy, and
  (b) separately producing indications of the occurrence rate of only the pulses of amplitudes corresponding to respective characteristic energy peaks, the improvement comprising:
  (c) substantially continuously, during the production of each indication, producing a pulse train corresponding to a fraction of the pulses occurring in each energy peak above the lowest energy peak to be indicated, and
  (d) substantially continuously during the production of each indication subtracting from the pulses occurring in each energy peak the pulses in the pulse train so produced from each higher energy peak.

2. The method of claim 1 wherein each such pulse train is produced from the pulses remaining after said subtraction of the pulses from higher peaks.

3. The method of claim 2 further characterized by substantially continuously, during the production of each indication, producing pulse trains representative of background and continuously subtracting the pulses in such trains from each peak, and producing each of said first pulse trains from the pulses remaining after such subtraction.

4. The method of claim 1 wherein each such pulse train is produced by feeding the pulses occurring to a transmission link and periodically interrupting and restoring the operation of the transmission link.

5. In counting apparatus for measurement of radiations of different energies including:
  (a) a counter adapted to produce a pulse-height spectrum having peaks at amplitudes corresponding to energies of the incident radiation, superimposed on an amplitude distribution produced by radiation of higher energy,
  (b) pulse-height analysis channels coupled to the counter and having outputs responsive only to particular pulse-height ranges, and
  (c) means for continuously subtracting a preset fraction of the output in one channel from the output in another channel, the improved construction wherein the fraction-subtracting means comprises:
  (d) a selectively actuable pulse-train coupling between the channels, and
  (e) timing means actuating the coupling for only the preset fraction of the total elapsed time.

6. The improved apparatus of claim 5 further characterized by:
  (f) the timing means comprising a periodic pulse generator having a variable ratio of pulse duration to pulse repetition rate.

7. In counting apparatus for measurement of radiations of differing energies including:
  (a) a counter adapted to produce a pulse-height spectrum having peaks at amplitudes corresponding to energies of the incident radiation, superimposed on an amplitude distribution produced by radiation of higher energy, (b) pulse-height analysis channels coupled to the counter and having pulse outputs responsive only to particular pulse-height ranges, and (c) means for continuously subtracting a preset fraction of the output pulses of one channel from the output pulses of another channel, the improved construction having:

(d) at least three such channels of successively higher pulse-height ranges, and (e) means to subtract from the output pulses of each channel other than the highest channel a fraction of the output pulses of every higher channel.

8. The improved apparatus of claim 7 characterized by:

(f) the output pulses of each higher channel of which the respective fraction is so subtracted being the net output pulses remaining after the subtraction of such fractions of the output pulses of still higher channels.

9. The improved apparatus of claim 8 further characterized by:

(g) means to subtract pulses representative of background from the output of each channel, the output pulses of each channel of which the respective fraction is derived being the net output pulses remaining after the further subtraction of such background pulses.

10. The improved apparatus of claim 9 further characterized by:

(h) each of said fraction-subtracting means comprising a periodic pulse generator having a ratio of pulse duration to pulse period corresponding to the applicable fraction, and means responsive to the pulses to transmit the output only during such duration.

References Cited

UNITED STATES PATENTS

| | | | |
|---|---|---|---|
| 3,008,045 | 11/1961 | Ruderman | 250—71.5 |
| 3,108,188 | 10/1963 | Dewan et al. | 250—71.5 |
| 3,114,835 | 12/1963 | Packard | 250—71.5 |
| 3,234,472 | 2/1966 | Ebeling et al. | 328—163 |
| 3,389,254 | 6/1968 | Russell | 250—71.5 |

RALPH G. NILSON, Primary Examiner

MORTON J. FROME, Assistant Examiner

U.S. Cl. X.R.

324—78; 328—163